(12) United States Patent
Dundas et al.

(10) Patent No.: US 8,671,269 B2
(45) Date of Patent: Mar. 11, 2014

(54) BRANCH PREDICTOR ACCURACY BY FORWARDING TABLE UPDATES TO PENDING BRANCH PREDICTIONS

(75) Inventors: James David Dundas, Austin, TX (US); Nikhil Gupta, Sunnyvale, CA (US); Marvin Denman, Round Rock, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 644 days.

(21) Appl. No.: 12/947,206

(22) Filed: Nov. 16, 2010

(65) Prior Publication Data

US 2012/0124348 A1 May 17, 2012

(51) Int. Cl.
*G06F 9/38* (2006.01)
(52) U.S. Cl.
USPC .......................................... 712/239; 712/240
(58) Field of Classification Search
None
See application file for complete search history.

(56) References Cited

U.S. PATENT DOCUMENTS

| | | | | |
|---|---|---|---|---|
| 5,864,697 A | * | 1/1999 | Shiell | 712/240 |
| 2006/0168432 A1 | * | 7/2006 | Caprioli et al. | 712/235 |

* cited by examiner

*Primary Examiner* — Kenneth Kim
(74) *Attorney, Agent, or Firm* — Wililams Morgan, P.C.

(57) ABSTRACT

A method and apparatus are provided for increasing the accuracy of a branch predictor. A branch prediction table provides a first instance of a branch prediction value associated with an instruction being speculatively executed a first time; and provides a second instance of the branch prediction value associated with the instruction being speculatively executed a second rime. The first instance of the branch prediction value may be subsequently revised after the instruction associated with the first instance of the branch prediction value is retired. Information regarding whether that branch instruction was accurately predicted may then be used to update the branch prediction table and the second instance of the branch prediction value.

21 Claims, 4 Drawing Sheets

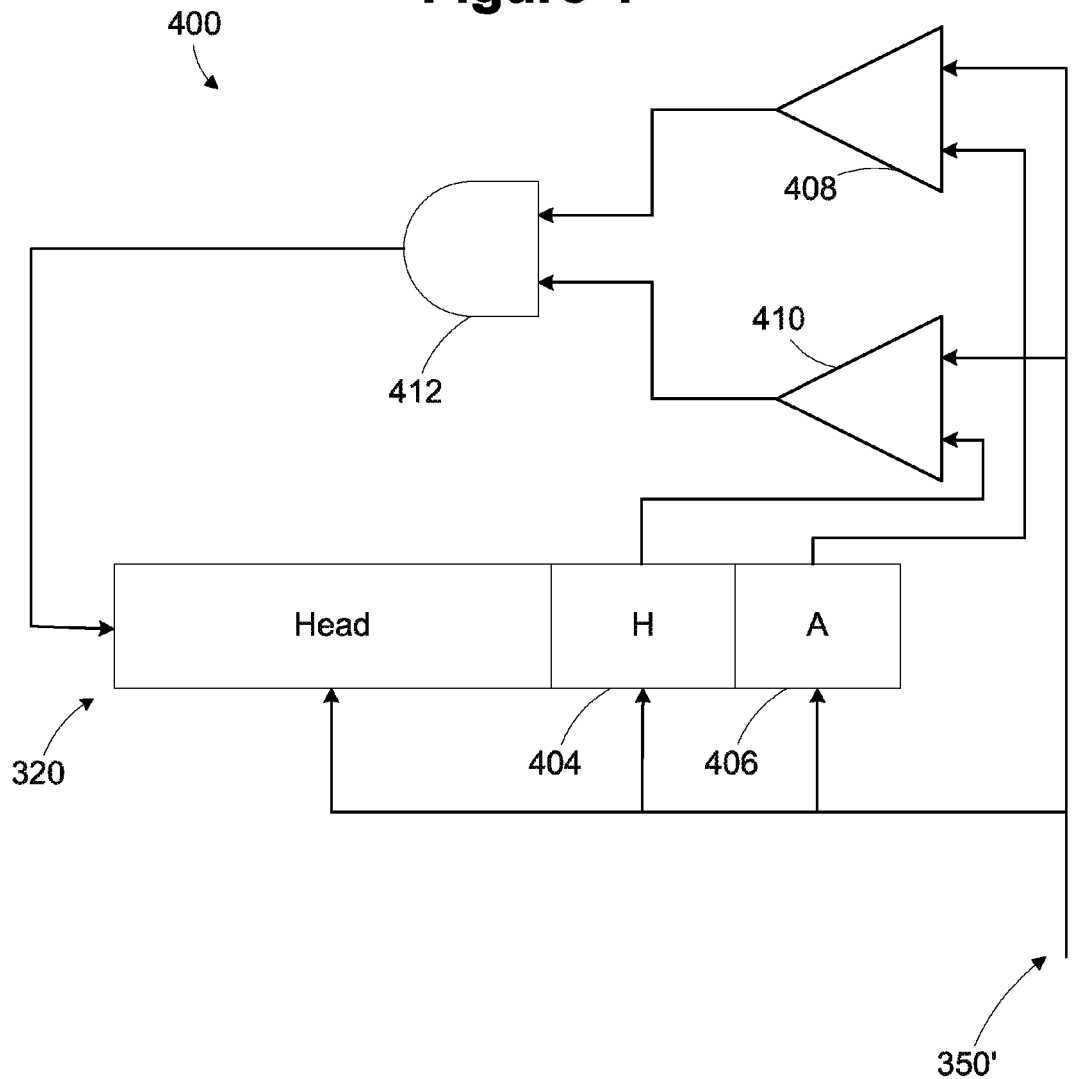

BRANCH PREDICTOR ACCURACY BY FORWARDING TABLE UPDATES TO PENDING BRANCH PREDICTIONS

CROSS-REFERENCE TO RELATED APPLICATIONS

Not applicable.

BACKGROUND

The disclosed subject matter relates gene ally to branch prediction in a computer system and, more particularly, to forwarding table updates to pending branch predictions.

Program instructions for a processor are typically stored in sequential, addressable locations within a memory. When these instructions are processed, they may be fetched from consecutive memory locations and stored in a cache commonly referred to as an instruction cache. The instructions may later be retrieved from the instruction cache and executed. Each the an instruction fetched from memory, a pointer within the processor may be updated so that it contains the address of the next instruction in the sequence. The instruction is the sequence may commonly be referred to as the next sequential instruction pointer. Sequential instruction fetching, updating of the next instruction pointer and execution of sequential instructions, may continue linearly until an instruction, commonly referred to as a branch instruction, is encountered and taken.

A branch instruction is an instruction that causes subsequent instructions to be fetched from one of at least two addresses: a sequential address identifying an instruction stream beginning with instructions, which directly follow the branch instruction; or an address referred to as a "target address," which identifies an instruction stream beginning at an arbitrary location in memory. A branch instruction, referred to as an "unconditional branch instruction," always branches to the target address, while a branch instruction, referred to as a "conditional branch instruction," may select either the sequential or the target address based on the outcome of a prior instruction.

To efficiently execute instructions, processors may implement a mechanism, commonly referred to as a branch prediction mechanism. A branch prediction mechanism determines a predicted direction ("taken" or "not taken") for an encountered branch instruction, allowing subsequent instruction fetching to continue along the predicted instruction stream indicated by the branch prediction. For example, if the branch prediction mechanism predicts that the branch instruction will be "taken," then the next instruction fetched is located at the target address, if the branch mechanism predicts that the branch instruction will not be taken, then the next instruction fetched is sequential to the branch instruction.

If the predicted instruction stream is correct, then the number of instructions executed per clock cycle is advantageously increased. However, if the predicted instruction stream is incorrect (i.e., one or more branch instructions are predicted incorrectly), then the instructions from the incorrectly predicted instruction stream are discarded from the instruction processing pipeline and the other instruction stream is fetched. Therefore, the number of instructions executed per clock cycle is decreased.

There is an incentive to construct accurate branch prediction schemes to avoid pipeline stalls and improve computer performance. Those skilled in the art will appreciate that the branch prediction mechanism is more effective when it has up-to-date information from which to make a decision regarding whether a branch instruction will be "taken" or "not taken." Accordingly, it is useful to update the branch prediction mechanism with information regarding whether the prediction proved accurate as each branch instruction is retired. This up-to-date information may then be used to make future branch predictions more accurate. However, because the instruction stream is being fetched well in advance, there may be numerous branch instructions that are still pending that used the now out-of-date information to make a prediction. Accordingly, these still pending branch instructions may be less accurately predicted than the current information would permit and now contain out-of-date information, which can disadvantageously cause the branch prediction scheme to operate less effectively. This can also cause the branches that were predicted with out-of-date information to update the predictors incorrectly, which can cause the predictors to frequently fail to "lock on" to branch outcome patterns that in theory the prediction algorithm should be able to predict with high accuracy.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method that comprises retrieving from a branch prediction table a first instance of a branch prediction value associated with an instruction being speculatively executed a first time; and retrieving from the branch prediction table a second instance of the branch prediction value associated with the instruction being speculatively executed a second time. The first instance of the branch prediction value is revised in response to the instruction associated with the first instance of the branch prediction value being retired; and the branch prediction table and the second instance of the branch prediction value are updated with the revised first instance of the branch prediction value.

Another aspect of the disclosed subject matter is seen in an apparatus, comprising a branch prediction table, and a first and second logic circuit. The branch prediction table is adapted for providing a first instance of a branch prediction value associated with an instruction being speculatively executed a first time, and a second instance of the branch prediction value associated with the instruction being speculatively executed a second time The first logic circuit may revise the first instance of the branch prediction value in response to the instruction associated with the first instance of the branch prediction value being retired. The second logic circuit updates the branch prediction table and the second instance of the branch prediction value with the revised first instance of the branch prediction value.

Another aspect of the disclosed subject matter is seen in a computer readable program storage device encoded with instruction that, when executed by a computer, performs a method that comprises retrieving from a branch prediction table a first instance of a branch prediction value associated with an instruction being speculatively executed a first time; and retrieving from the branch prediction table a second instance of the branch prediction value associated with the instruction being speculatively executed a second time. The first instance of the branch prediction value is revised in response to the instruction associated with the first instance of the branch prediction value being retired; and the branch prediction table and the second instance of the branch prediction value are updated with the revised first instance of the branch prediction value.

Another aspect of the disclosed subject matter is seen in a computer readable storage device encoded with data that, when implemented in a manufacturing facility, adapts the manufacturing facility to create an apparatus comprising a branch prediction table, and a first and second logic circuit. The branch prediction table is adapted for providing a first instance of a branch prediction value associated with an instruction being speculatively executed a first time, and a second instance of the branch prediction value associated with the instruction being speculatively executed a second time The first logic circuit may revise the first instance of the branch prediction value in response to the instruction associated with the first instance of the branch prediction value being retired. The second logic circuit updates the branch prediction table and the second instance of the branch prediction value with the revised first instance of the branch prediction value.

BRIEF DESCRIPTION OF THE SEVERAL VIEWS OF THE DRAWINGS

The disclosed subject matter will hereafter be described with reference to the accompanying drawings, wherein like reference numerals denote like elements, and:

FIG. 4 is a block diagram of comparator that may be used in the branch predictor of FIG. 3.

Figure 1:
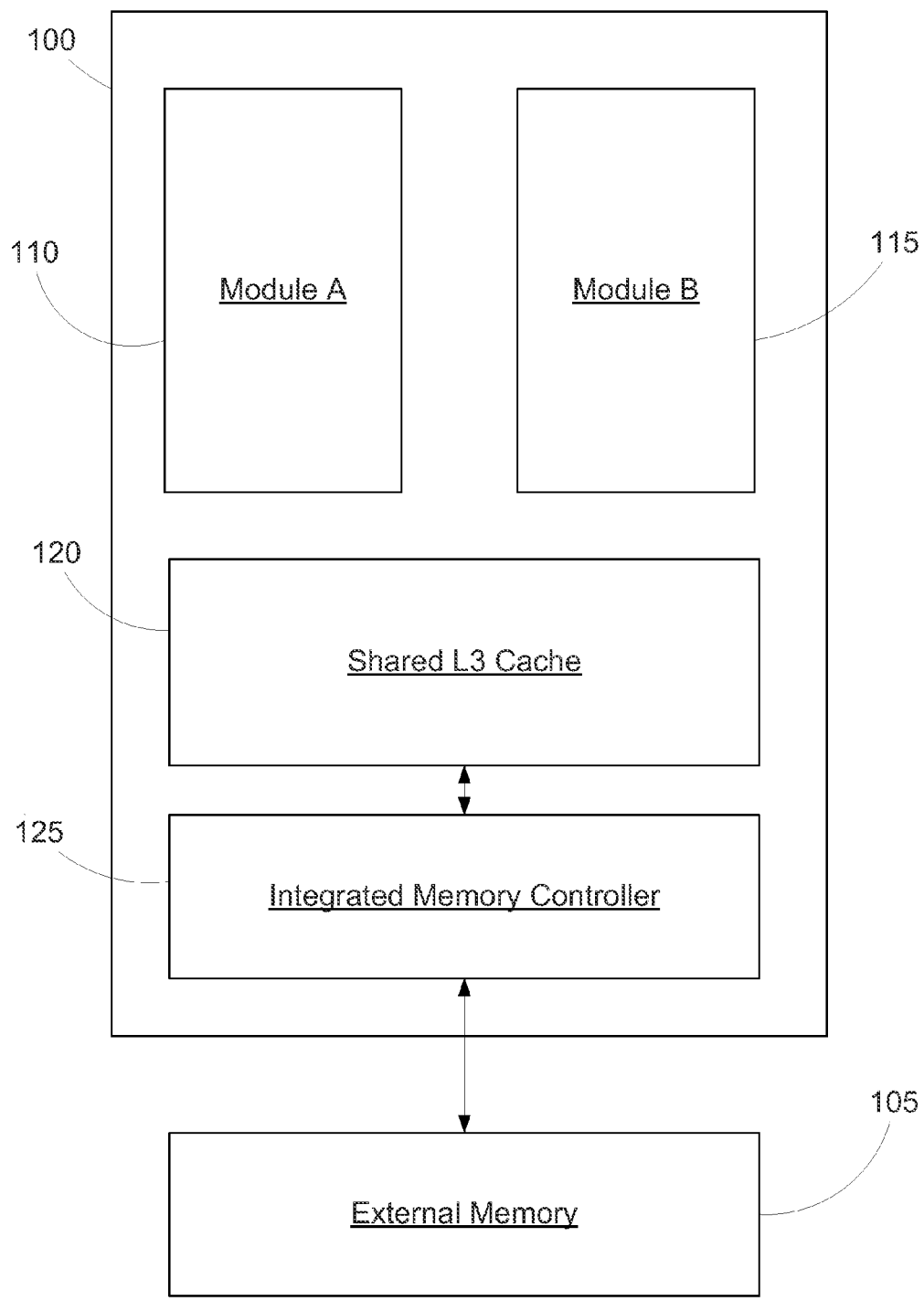
FIG. 1 is a block level diagram of a computer system, including a processor interfaced with external memory.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a processor 100 coupled with an external memory 105. Those skilled in the art will recognize that a computer system may be constructed from these and other components. However, to avoid obfuscating the instant invention only those components useful to are understanding of the present invention are included.

In one embodiment, the processor 100 employs a pair of substantially similar modules, module A 110 and module B 115. The modules 110, 115 are substantially similar and include processing capability (as discussed below in more detail in conjunction with FIG. 2). The modules 110, 115 engage in processing under the control of software, and thus access memory, such as external memory 105 and/or caches, such as a shared L3 cache 120 and/or internal caches (discussed in more detail below in conjunction with FIG. 2). An integrated memory controller 125 is included within each of the modules 110, 115. The integrated memory controller 125 generally operates to interface the modules 110, 115 with the conventional external semiconductor memory 105. Those skilled in the art will appreciate that each of the modules 110, 115 may include additional circuitry for performing other useful tasks.

Figure 2:
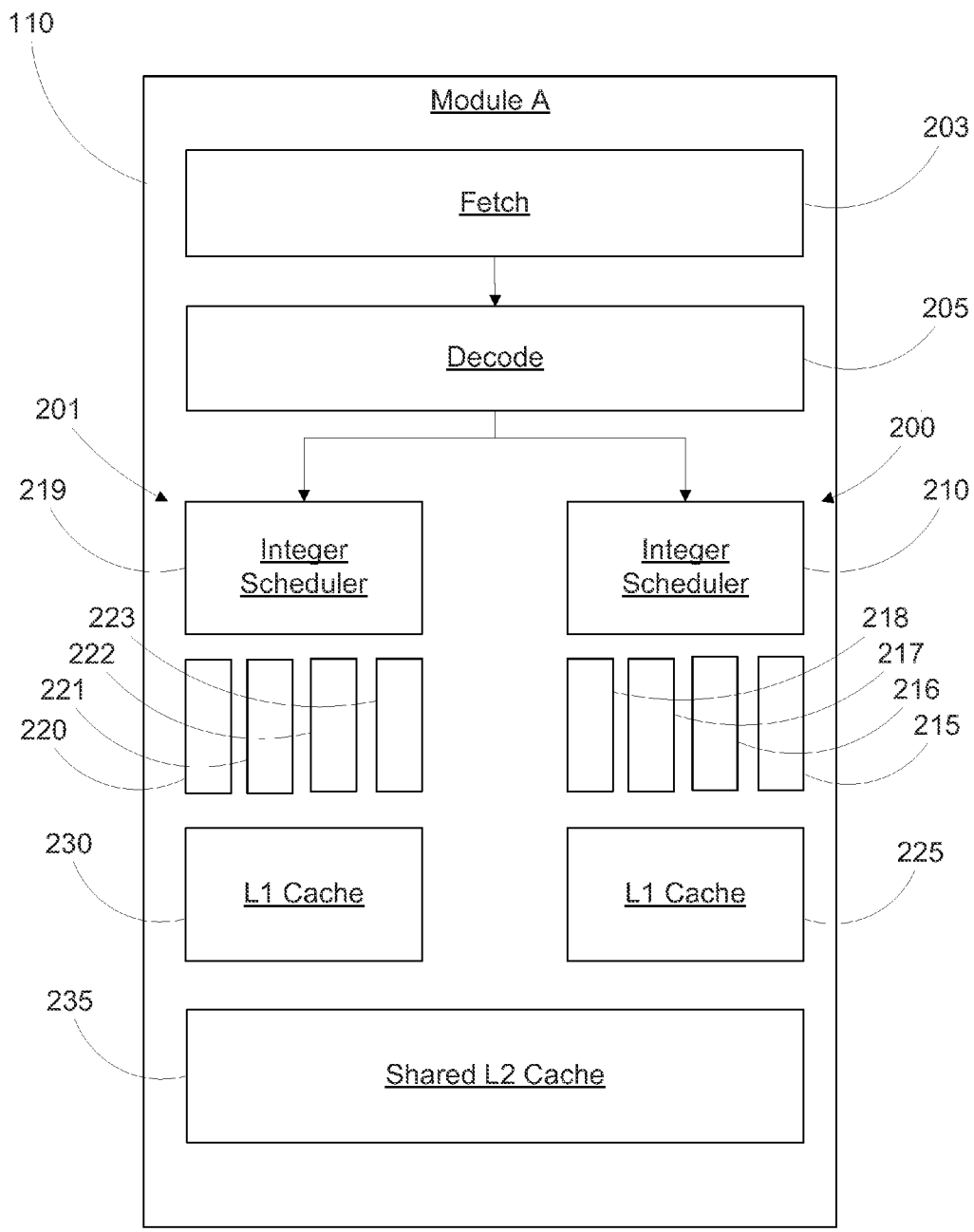
FIG. 2 is a simplified block diagram of a dual-core module that is part of the processor of FIG. 1.

Turning now to FIG. 2, a block diagram representing one exemplary embodiment of the internal circuitry of either of the modules 110, 115 is shown. Generally, the module 110 consists of two processor cores 200, 201 that include both individual components and shared components. For example, the module 110 includes shared fetch and decode circuitry 203, 205, as well as a shared L2 cache 235. Both of the cores 200, 201 have access to and utilize these shared components.

The processor core 200 also includes components that are exclusive to it. For example, the processor core 200 includes an integer scheduler 210, four substantially similar, parallel pipelines 215, 216, 217, 218, and an L1 Cache 225. Likewise, the processor core 201 includes an integer scheduler 219, four substantially similar, parallel instruction pipelines 220, 221, 222, 223, and an L1 Cache 230.

The operation of the module 110 involves the fetch circuitry 203 retrieving instructions from memory, and the decode circuitry 205 operating to decode the instructions so that they may be executed on one of the available pipelines 215-218, 220-223. Generally, the integer schedulers 210, 219 operate to assign the decoded instructions to the various instruction pipelines 215-218, 220-223 where they are speculatively executed. During the speculative execution of the instructions, the instruction pipelines 215-218, 220-223 may access the corresponding L1 Caches 225, 230, the shared L2 Cache 235, the shared L3 cache 120 and/or the external memory 105.

Figure 3:
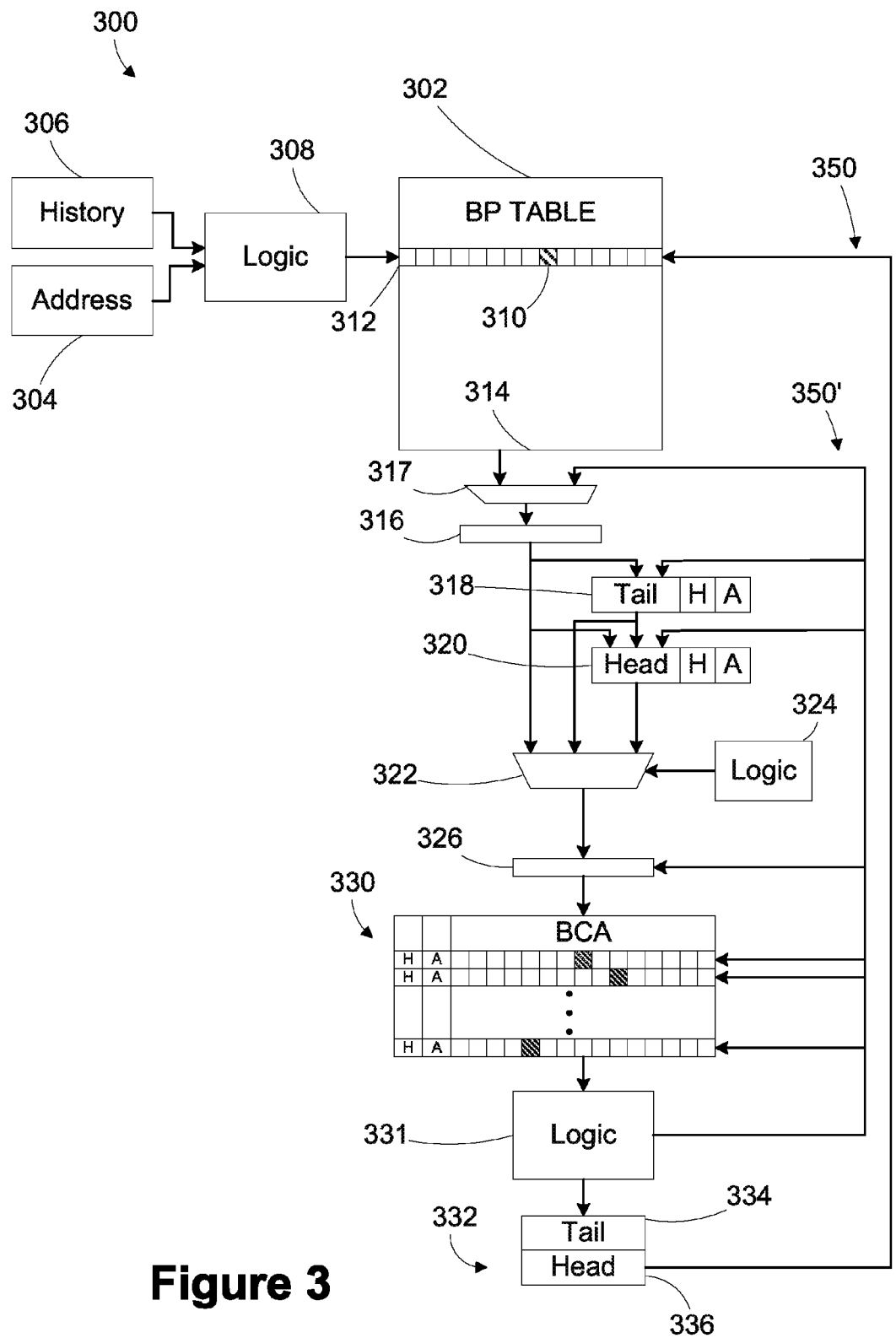
FIG. 3 is a block diagram of one embodiment of a branch predictor that may be employed in the processor of FIG. 2.

Turning now to FIG. 3, those skilled in the art will appreciate that operation of the fetch circuitry 203 is complicated by the existence of instructions that are capable of jumping to a subsequent instruction that is not sequentially stored in memory. For example, processors typically include instructions that jump or branch to a predetermined location, or in some instances, that jump or branch to a non-sequential memory location based on a detected condition (e.g., conditional jumps or branches). Thus, in order for the fetch circuitry 203 to retrieve the proper subsequent instructions that are to be executed, the fetch circuitry 203 identifies these branching instructions and predicts if the conditional branches will be taken or not taken (i.e., T/NT). This prediction performed by a branch predictor 300.

The branch predictor 300 includes a Branch Prediction (BP) table 302 that is accessed using one or more parameters associated with the branch instruction that is being predicted. For example, the parameters may include the linear address or program counter 304 associated with the branch instruction, a historical value 306 that reflects whether the branch was T/NT in the past, or other useful parameters. These parameters 304, 306 are analyzed in a logic circuit 308 to identify a location 310 within the BP Table 302 at which an appropriate Branch Prediction value is stored. The BP Table 302 may be arranged in a variety of configurations without departing from the spirit and scope of the instant invention. In one embodiment of the instant invention, the BP table 302 includes a plurality of lines 312 with each line containing BP values in a plurality of locations 310.

The address of the desired location 310 of line 312 is delivered from the logic 308 to the BP Table 302 such that the desired location 310, or an entire line 312 including the desired location 310, is produced at an output port 314 of the BP Table 302. The BP values produced at the output port 314 are delivered to a register 316 that is configured via a multiplexer 317 to controllably receive and store BP values from two separate sources. The first source is the BP Table 302. The second source is discussed more fully below in conjunction with a feedback path 350'.

The register 316 is coupled to a tail register 318, a head register 320 and a multiplexer 322. The multiplexer has a select input coupled to a logic circuit 324 such that the multiplexer 322 may be controlled to pass the values stored in any of the registers 316, 318 or 320. The tail register 318 has input ports coupled to an output port of the register 316 and to the feedback path 350' such that on each dock cycle, the tail register 318 may be filled with either of the BP Values contained in the register 316 or the feedback path 350'. Similarly, the Head register 320 has input ports coupled to an output port of the register 316, an output port of the Tail register 320 and the feedback path 350', such that on each dock cycle the Head register 320 may be filled with one of the BP Values contained in the register 316, the Tail register 318 or the feedback path 350'. This arrangement allows the multiplexer 322 to controllably pass the BP values currently being delivered from the BP Table 302 (via the register 316), the BP value generated by the BP Table 302 during the immediately prior dock cycle (via the Tail register 318) or the BP value generated by the BP Table 302 from two dock cycles earlier (via the Head register 320). Additionally, the BP value from the feedback path 350' may also be passed by the multiplexer 322 if it has been selectively stored in any of the registers 316, 318, or 320, as discussed in greater detail below.

The BP values selected by the multiplexer 322 are delivered to a register 326, which is similar to the register 316 in that the register 326 is configured to controllably receive and store BP values from two separate sources. The first source is the multiplexer 322. The second source is discussed more fully below in conjunction with the feedback path 350'.

At least a portion of the BP value contained in the register 326 is stored in a Branch Checkpoint Array (BCA) 330. In one embodiment of the instant invention, the BCA 330 is configured to store a plurality of data items, including the BP value from the desired location 310 in the BP Table 302. The BCA 330 stores the BP values while their corresponding branch instructions are being speculatively executed in the pipelines 215-218, 220-223. After a branch instruction is retired, the data that includes the BP value for the retired instruction is read out of the BCA 330 and delivered to a logic circuit 331. The logic circuit 331 identifies whether the corresponding branch instruction was T/NT and updated information regarding that branch instruction is stored in a queue 332.

In one embodiment of the instant invention, the queue 332 is a 2-line queue having a tail entry 334 and a head entry 336. As each branch instruction is retired, the corresponding data is delivered from the BCA 330 through the logic 331 to the queue 332 where it passes from the tail entry 334 to the head entry 336 and, and that information is delivered back to the BP Table 302 via the feedback path 350. In this manner, the BP Table 302 is updated to reflect the most recent history of at least the corresponding branch instruction. Thus, when that particular branch instruction is next executed, it will access the most current information from the BP Table 302. The Queue 332 provides a temporary storage location for buffering the updated BP information until the BP Table 302 is not currently executing a read.

Those skilled in the art will appreciate that the just-retired branch instruction may be executed numerous times in the future, and, in fact, may also be in the process of being speculatively executed again at the time that it has been retired. That is, in a software program that includes a relatively small loop, the same branch instruction may be consecutively executed many times in a relatively short period of time, such that the same branch instruction is in various stages of speculative execution at the same time. For example, the same branch instruction may be associated with the TINT designation produced by the logic circuit 331 and the data stored in the register 316, the Tail register 318, the Head register 320, the register 326, or the various entries in the BCA 330. Thus, to ensure that each of these entries has the most up-to-date information, a feedback path 350' is coupled from the logic 331 to the register 316, the Tail register 318, the Head register 320, the register 326, and each of the entries in the BCA 330 so that at least the information regarding that instruction is updated in each of these other locations as well.

To identify which of these entries corresponds to and needs updating with the information in the feedback path 350', the address 304 and history 306 associated with each entry 310 are passed with the BP value to the register 316, the Tail register 318, the Head register 320, the register 326, and each entry in the BCA 330. Likewise, the feedback path 350' also includes the address 304 and history 306 so that a comparison may be performed to identify the various entries that should be also be updated with the information contained in the feedback path 350'. FIG. 4 shows one embodiment of a block level diagram of a comparator circuit 400 that may be used with the register 316, the Tail register 318, the Head register 320, the register 326, and each of the entries in the BCA 330 to identify whether that location should be updated with the information contained in the feedback path 350'. For purposes of illustration only, the comparator circuit 400 is shown and discussed in conjunction with the operation of the Head register 320. However, those skilled in the art will appreciate that the comparator circuit 400 may be readily adapted to operate with any of the register 316, the Tail register 318, the Head register 320, the register 326, and each of the entries in the BCA 330.

In one embodiment of the instant invention, the feedback path 350' includes not only the BP value, but also the history and the address of the conditional branch instruction that has been recently retired. The Head register 320 contains a BP value 402, history 404, and address 406 of a conditional branch instruction that is in the process of being speculatively executed. If the Head register 320 contains information related to the same instruction that is in the feedback path 350', then the comparator circuit 400 operates to bad the information in the feedback path 350' into the Head register 320. The History and Address portions of the feedback path 350' are coupled to a first input port of first and second comparators 408, 410. The history 404 and address 406 of the Head register 320 are coupled to a second input port of first and second comparators 408, 410. When the history 404 and address 406 of the head register 320 matches the history and address from the feedback path 350', then the comparators 408, 410 each deliver signals to a logic circuit, such as an AND gate 412, which delivers a control signal to bad the BP value, history and address from the feedback path 350' into the Head register 320. In this manner, not only is the BP table 302 updated, but so too is each instruction that is in the process of being speculatively executed and is stored in one or more of the register 316, the Tail register 318, the Head register 320, the register 326, and each of the entries in the BCA 330. In this manner, stale BP values that are stored in the register 316, the Tail register 318, the Head register 320, the register 326, and each of the entries in the BCA 330 are promptly updated with the latest BP values immediately after a corresponding instruction is retired.

It is further contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate Graphic Database System (GDS) data, GOSH data and the like. GOSH data, for example, is a descriptive file format and may be used in different embodiments to represent a three-dimensional model of a semiconductor product or device. Such models may be used by semiconductor manufacturing facilities to create semiconductor products and/or devices. The GOSH data may be stored as a database or other program storage structure. This data may also be stored on a computer readable storage device (e.g., a data storage units, a RAM, compact discs, DVDs, solid state storage and the like). In one embodiment, the GOSH data (or other similar data) may be adapted to configure a manufacturing facility (e.g., through the use of mask works) to create devices capable of embodying various aspects of the instant invention. In other words, in various embodiments, this GOSH data (or other similar data) may be programmed into a computer, processor or controller, which may then control, in whole or part, the operation of a semiconductor manufacturing facility (or fab) to create semiconductor products and devices. For example, in one embodiment, silicon wafers containing various configurations of the embodiments set forth herein may be created using the GOSH data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
   retrieving from a branch prediction table a first instance of a branch prediction value associated with an instruction being speculatively executed a first time;
   storing the first instance of the branch prediction value in a branch checkpoint array;
   retrieving from the branch prediction table a second instance of the branch prediction value associated with the instruction being speculatively executed a second time;
   storing the second instance of the branch prediction value in a first storage location;
   revising the first instance of the branch prediction value in response to the instruction being speculatively executed the first time being retired; and
   updating the branch prediction table and the second instance of the branch prediction value with the revised first instance of the branch prediction value.

2. A method, as set forth in claim 1, wherein updating the branch prediction table and the second instance of the branch prediction value with the revised first instance of the branch prediction value further comprises updating the second instance of the branch prediction value with the revised first instance of the branch prediction value in response to the instruction associated with the second instance of the branch prediction value still being in the process of being executed.

3. A method, as set forth in claim 1, wherein updating the branch prediction table further comprises storing the revised first instance of the branch prediction table in a queue.

4. A method, as set forth in claim 1, wherein updating the second instance of the branch prediction value substantially immediately after the revised first instance of the branch prediction table is available.

5. A method, as set forth in claim 1, further comprising:
   retrieving from the branch prediction table a third instance of the branch prediction value associated with the instruction being speculatively executed a third time; and updating the third instance of the branch prediction value with the revised first instance of the branch prediction value.

6. A method, as set forth in claim 1, wherein updating the second instance of the branch prediction value with the revised first instance of the branch prediction value further comprises updating the second instance of the branch prediction value with the revised first instance of the branch prediction value at any of a plurality of locations.

7. An apparatus, comprising:
a branch prediction table adapted for providing a first instance of a branch prediction value associated with an instruction being speculatively executed a first time, and a second instance of the branch prediction value associated with the instruction being speculatively executed a second time;
a branch checkpoint array for receiving at least the first instance of the branch prediction value;
a first storage location for receiving the second instance of the branch prediction value;
a first logic circuit for revising the first instance of the branch prediction value in response to the instruction being speculatively executed the first time being retired; and
a second logic circuit for updating the branch prediction table and the second instance of the branch prediction value with the revised first instance of the branch prediction value.

8. An apparatus, as set forth in claim 7, wherein the second logic circuit further comprises a queue adapted for receiving the revised first instance of the branch prediction value and subsequently providing the revised first instance of the branch prediction value to the branch prediction table.

9. An apparatus, as set forth in claim 7, wherein the second logic circuit compares address information associated with the revised first instance of the branch prediction value with address information associated with the second instance of the branch prediction value and updates the storage location containing the second instance of the branch prediction value with the revised first instance of the branch prediction value in response to detecting a match.

10. An apparatus, as set forth in claim 7, wherein the first storage location contains at least one of the second instance of the branch prediction value and the revised first instance of the branch prediction value during a period of time corresponding to at least when the instruction is being speculatively executed the second time.

11. An apparatus, as set forth in claim 7, wherein the first storage location is comprised of a plurality of storage locations, each storage location being adapted to receive the second instance of the branch prediction value and the revised first instance of the branch prediction value.

12. A non-transitive, computer readable program storage device encoded with instructions that, when executed by one or more processors, performs a method, comprising:
retrieving from a branch prediction table a first instance of a branch prediction value associated with an instruction being speculatively executed a first time;
storing the first instance of the branch prediction value in a branch checkpoint array;
retrieving from the branch prediction table a second instance of the branch prediction value associated with the instruction being speculatively executed a second time;
storing the second instance of the branch prediction value in a first storage location;
revising the first instance of the branch prediction value in response to the instruction being speculatively executed the first time being retired; and
updating the branch prediction table and the second instance of the branch prediction value with the revised first instance of the branch prediction value.

13. A computer readable program storage device, as set forth in claim 12, wherein updating the branch prediction table and the second instance of the branch prediction value with the revised first instance of the branch prediction value further comprises updating the second instance of the branch prediction value with the revised first instance of the branch prediction value in response to the instruction associated with the second instance of the branch prediction value still being in the process of being executed.

14. A computer readable program storage device, as set forth in claim 12, wherein updating the branch prediction table further comprises storing the revised first instance of the branch prediction table in a queue.

15. A computer readable program storage device, as set forth in claim 12, wherein updating the second instance of the branch prediction value substantially immediately after the revised first instance of the branch prediction table is available.

16. A computer readable program storage device, as set forth in claim 12, further comprising: retrieving from the branch prediction table a third instance of the branch prediction value associated with the instruction being speculatively executed a third time; and updating the third instance of the branch prediction value with the revised first instance of the branch prediction value.

17. A computer readable program storage device, as set forth in claim 12, wherein updating the second instance of the branch prediction value with the revised first instance of the branch prediction value further comprises updating the second instance of the branch prediction value with the revised first instance of the branch prediction value at any of a plurality of locations.

18. A non-transitive, computer readable storage device encoded with data that, when implemented in a manufacturing facility, adapts the manufacturing facility to create an apparatus, comprising:
a branch prediction table adapted for providing a first instance of a branch prediction value associated with an instruction being speculatively executed a first time, and a second instance of the branch prediction value associated with the instruction being speculatively executed a second time;
a branch checkpoint array for receiving at least the first instance of the branch prediction value;
a first storage location for receiving the second instance of the branch prediction value;
a first logic circuit for revising the first instance of the branch prediction value in response to the instruction being speculatively executed the first time being retired; and
a second logic circuit for updating the branch prediction table and the second instance of the branch prediction value with the revised first instance of the branch prediction value.

19. A non-transitive, computer readable storage device encoded with data that, when implemented in a manufacturing facility, adapts the manufacturing facility to create an apparatus, as set forth in claim 18, wherein the second logic circuit further comprises a queue adapted for receiving the revised first instance of the branch prediction value and subsequently providing the revised first instance of the branch prediction value to the branch prediction table.

20. A non-transitive, computer readable storage device encoded with data that, when implemented in a manufacturing facility, adapts the manufacturing facility to create an apparatus, as set forth in claim 18, wherein the second logic circuit compares address information associated with the revised first instance of the branch prediction value with address information associated with the second instance of the branch prediction value and updates the storage location containing the second instance of the branch prediction value with the revised first instance of the branch prediction value in response to detecting a match.

21. A non-transitive, computer readable storage device encoded with data that, when implemented in a manufacturing facility, adapts the manufacturing facility to create an apparatus, as set forth in claim 18, wherein the first storage location contains at least one of the second instance of the branch prediction value and the revised first instance of the branch prediction value during a period of time corresponding to at least when the instruction is being speculatively executed the second time.

* * * * *